May 13, 1952     E. K. VON MERTENS     2,596,312
DISPENSER OF KITCHEN ARTICLES

Filed March 12, 1947     2 SHEETS—SHEET 1

INVENTOR
Ernest K. Von Mertens

May 13, 1952  E. K. VON MERTENS  2,596,312
DISPENSER OF KITCHEN ARTICLES

Filed March 12, 1947  2 SHEETS—SHEET 2

INVENTOR
Ernest K. Von Mertens

Patented May 13, 1952

2,596,312

UNITED STATES PATENT OFFICE 2,596,312

DISPENSER OF KITCHEN ARTICLES

Ernest K. Von Mertens, West Hartford, Conn.

Application March 12, 1947, Serial No. 734,031

5 Claims. (Cl. 211—78)

This invention relates to articles which are stacked in sets, such as kitchen bowls, cooking utensils, laboratory implements, etc. The object of this invention is to simplify the dispensing of such articles which are of varying size and are usually nested or stacked in sets.

The purposes of making articles, as for instance kitchen bowls, available in sets is obviously intended for the convenience of the user to enable him to select the most approprate size of utensil for the purpose. However, such selection has required a great amount of handling causing waste of time, space, and possible breakage of the article.

The present invention is intended to simplify the removal of any article of a set by eliminating all unnecessary handling and reducing the usual causes of breakage. This has been accomplished by hanging each article within an individual basket, such as a wire container which is made to fit its particular size. These containers, according to their size, are then suspended by bearings or hinges on a post in such a manner that they can be moved or rotated without interference with one another.

A preferred embodiment of the invention is illustrated in the accompanying drawing in which Figure 1 is a view, in perspective, of the dispenser suspending in particular a set of kitchen bowls.

Figure 1:
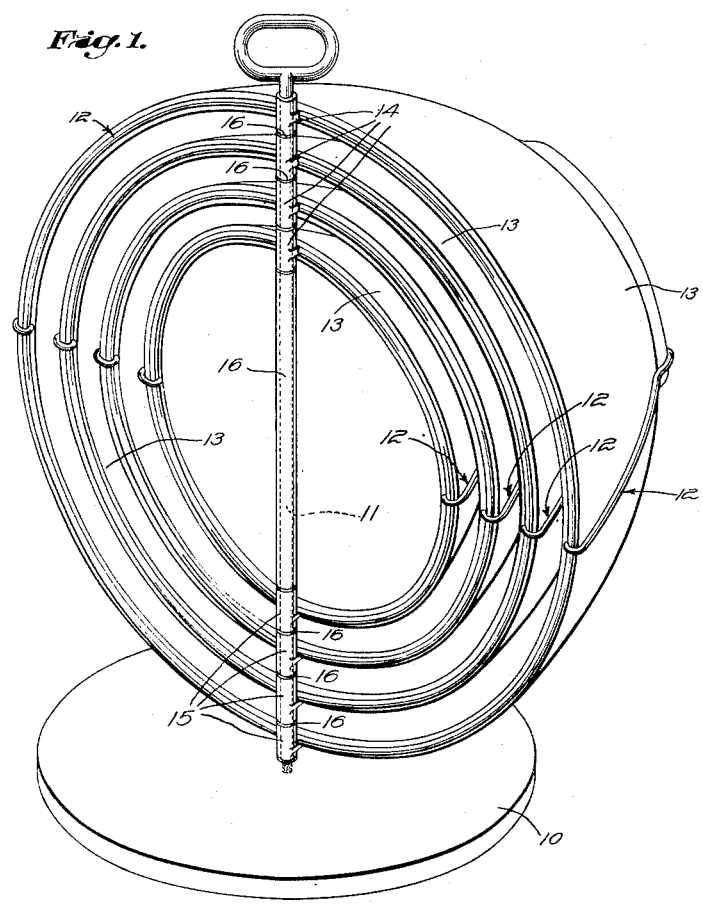

The kitchen bowl dispenser, as shown in Figure 1, comprises a base 1 to which a post 11 of circular cross-section extending upward is solidly connected, and a number of baskets 12 shaped to support the individual bowls 13 of a set of kitchen bowls. The baskets 12 are suspended to the post 11 by upper and lower bearings 14, 15 which may be correctly spaced by discs or spacers 16. This arrangement permits the baskets 12 and the bowls 13 suspended therein to rotate freely around the post 11 without interference within one another. Any bowl 13 may then be selected by rotating its basket 12 into position away from the others where it may be lifted from the basket 12 without interference. To permit the smallest possible spacing of the bowls 13 it is preferred that their shape be as nearly spherical as possible and that the center of the bowls 13 and the center line of the post 11 fall together.

Figure 2:
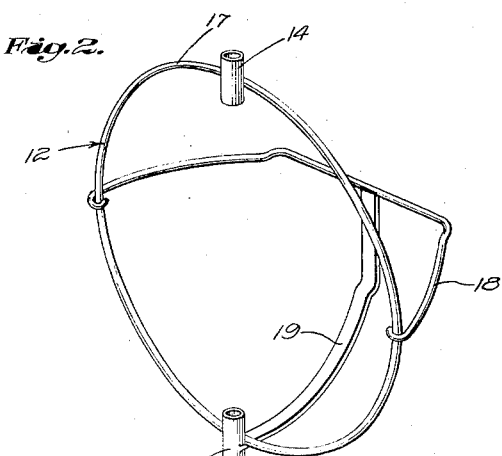
Figure 2 shows a perspective view of one of the individual baskets used to suspend a certain size kitchen bowl.

Figure 2 shows a preferred design of one of the individual baskets 12 consisting of the main support ring 17 to which are attached upper and lower bearings 14, 15. The bowl 13 is held in place by semi-circular bars 18 and vertical reinforcing strip 19. The individual parts of the basket 12 may best be joined by soldering, brazing, welding, riveting, or screwing together. It is preferred that the material used be of rustless or stainless material or be protected by corrosive preventative means such as paints, metal plating, or rubber covers. The basket 12 may be assembled of wire or metal strip or may be stamped of metal or molded of plastic materials.

Figure 3:
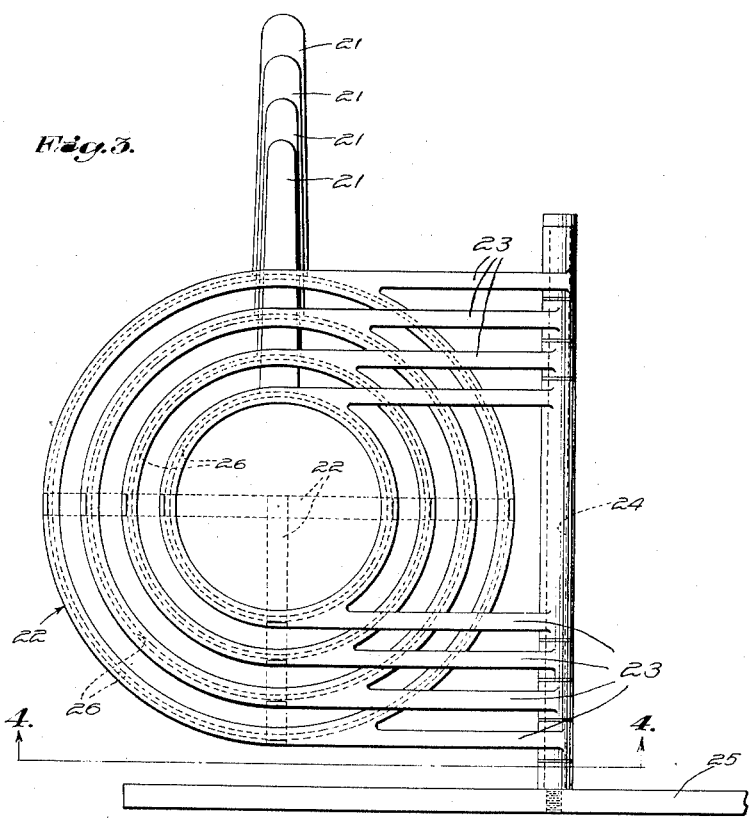
Figure 3 shows the front elevation of a dispenser for articles of a set which are not entirely symmetrical.
Figure 4:
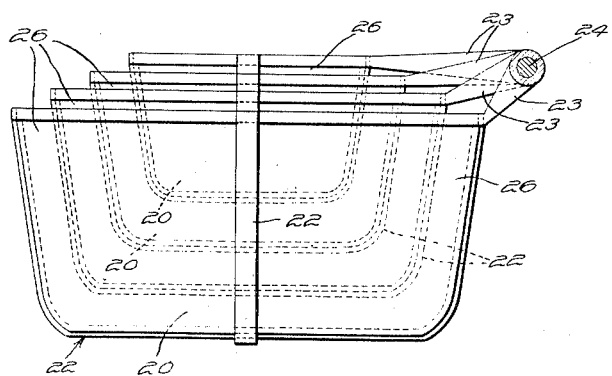
Figure 4 is a bottom view along the line 4—4 of the dispenser shown in Figure 3.

Figure 3 shows a variation of the dispenser for articles of a set which are not entirely symmetrical, such as cooking utensils 26 having a bowl shape part 20 attached to a conventional handle 21. The bowl part 20 of the kitchen utensil is fitted into a basket 22 of appropriate size with the handle 21 extending vertically upward. The baskets 22 are suspended by hinges 23 from a post 24 which is securely bolted to a base 25. The baskets 22 rotating all in the same plane, can then be folded similarly to the pages of a book, fitting into each other without interference. Any utensil 26 may then be selected by placing it into position away from the others where it may be lifted from the basket without difficulty.

While the invention is described herein particularly in connection with articles such as kitchen mixing bowls, it is also capable of use in connection with the storing and dispensing of other articles which may be nested or stacked. For instance, sets of articles of progressively varying sizes such as beakers, crucibles, cups, cans, fixtures, and the like may be mounted for ready dispensing in an apparatus constructed according to the teaching of this invention.

It is to be understood that the invention is not limited to the specific embodiment herein illustrated, and described, but may be used in other ways without departure from its spirit as defined by the following claims.

I claim:

1. A stand for storing and dispensing a plurality of articles such as mixing bowls of similar shapes and progressively varying sizes, comprising a base having a supporting post extending vertically upward therefrom, a plurality of pairs of spaced bearings mounted on said column for rotation about the longitudinal axis thereof, a plurality of normally nested baskets of progressively varying sizes carried respectively by said pairs of said bearings and rotatable therewith about said post, each of said baskets having an opening and being adapted to receive an article when rotated from nested position and each of said baskets being shaped so as to conform substantially to a surface of revolution having its centerline approximately coincident with said post.

2. A device according to claim 1, in which said baskets have top openings lying in substantially horizontal planes.

3. A rack comprising a stand having a plurality of superimposed normally nested baskets rotatably mounted thereon and adapted to support a plurality of articles progressively varying in size, said baskets progressively increasing in size and each of said baskets being adapted to receive and support an article and being rotatable independently from its nested position to a position outside of the envelope of said nested baskets, a post and each of said cages having a pair of bearings for pivotally mounting said cage on said post.

4. A carrier and dispenser of non-symmetric articles of substantially similar shape and progressively varying size, comprising, a base, a post on said base, a plurality of normally nested baskets of progressively varying size rotatably hinged for horizontal pivotal movement relative to said post, said post being located asymmetrically with respect to said baskets, and said baskets being movable out of nested position and each having a top opening for removal of the article contained therein.

5. A dispenser of articles and adapted to support a plurality of articles progressively varying in size comprising, a plurality of supporting baskets of substantially spherical shape and of progressively varying sizes adapted to be moved to nested storing position, each of said individual baskets being adapted to receive an article and being normally nested and rotatable from their nested storing position to a position outside of said nested position, a post, a pair of bearings on said post for pivotally supporting each of said baskets and each of said baskets having an envelope substantially spherical and having radii of progressively increasing values and substantially a common center.

ERNEST K. VON MERTENS.

REFERENCES CITED

The following references are of record in the file of this patent:

UNITED STATES PATENTS

| Number | Name | Date |
| --- | --- | --- |
| D. 88,167 | Nereim | Nov. 1, 1932 |
| 700,907 | Edwards | May 27, 1902 |
| 853,051 | Alson | May 7, 1907 |
| 866,299 | Parrill | Sept. 17, 1907 |
| 1,148,891 | Coultrap | Aug. 3, 1915 |

FOREIGN PATENTS

| Number | Country | Date |
| --- | --- | --- |
| 779,589 | France | Jan. 19, 1935 |